(12) United States Patent
Dalby et al.

(10) Patent No.: US 9,750,111 B2
(45) Date of Patent: Aug. 29, 2017

(54) INTEGRATED CONTROL CIRCUIT WITH COMBINED TEMPERATURE AND PRESENCE DETECTION

(71) Applicant: Tridonic GmbH & Co KG, Dornbirn (AT)

(72) Inventors: Paul Dalby, Middlesbrough (GB);
James Frankland, Spennymoor (GB);
Shukla Jagjitpati, Spennymoor (GB);
Ian Wilson, Sunderland (GB)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/907,361

(22) PCT Filed: Jul. 25, 2014

(86) PCT No.: PCT/EP2014/066022
§ 371 (c)(1),
(2) Date: Jan. 25, 2016

(87) PCT Pub. No.: WO2015/014740
PCT Pub. Date: Feb. 5, 2015

(65) Prior Publication Data
US 2016/0174338 A1    Jun. 16, 2016

(30) Foreign Application Priority Data

Jul. 29, 2013    (EP) ..................................... 13178352

(51) Int. Cl.
*H05B 37/02*    (2006.01)
*H05B 33/08*    (2006.01)

(52) U.S. Cl.
CPC ..... *H05B 37/0227* (2013.01); *H05B 33/0854* (2013.01); *Y02B 20/44* (2013.01)

(58) Field of Classification Search
CPC ............ H05B 33/0845; H05B 33/0848; H05B 33/0854
(Continued)

(56) References Cited

U.S. PATENT DOCUMENTS 6,798,341 B1 * 9/2004 Eckel ...................... G01K 1/045
340/12.32
9,001,317 B2 * 4/2015 Ramer ............... H05B 33/0842
356/213

(Continued)

OTHER PUBLICATIONS

International Search Report issued in connection with the corresponding International Application No. PCT/EP2014/066022 on Mar. 11, 2015.

*Primary Examiner* — Thuy Vinh Tran
(74) *Attorney, Agent, or Firm* — The H.T. Than Law Group

(57) ABSTRACT

An integrated control circuit (SE) and method for operating luminaries are provided. The integrated control circuit has at least one output for supplying a signal controlling a switch, such as a transistor, in an operating circuit (OM), in particular controlling directly or indirectly a dimming level of the luminaries, and a common input (Ts) arranged for being supplied with a combination of a temperature indicating signal and a presence indicating signal, the integrated control circuit (SE) being designed to adjust a switch control signal as a function of the electrical signal (ES) at the common input (Ts).

33 Claims, 3 Drawing Sheets

(58) Field of Classification Search
USPC .......... 315/185 R, 209 R, 291, 308, 309
See application file for complete search history.

(56) References Cited

U.S. PATENT DOCUMENTS

| | | | |
|---|---|---|---|
| 9,014,829 B2* | 4/2015 | Chemel | G01D 18/00 |
| | | | 700/19 |
| 2012/0091804 A1 | 4/2012 | Altonen et al. | |
| 2013/0063032 A1 | 3/2013 | Nevins et al. | |
| 2013/0241426 A1 | 9/2013 | Dohn et al. | |
| 2015/0156851 A1* | 6/2015 | Ramer | H05B 33/0842 |
| | | | 315/307 |

* cited by examiner

INTEGRATED CONTROL CIRCUIT WITH COMBINED TEMPERATURE AND PRESENCE DETECTION

FIELD OF THE INVENTION

The invention relates to a method and device, especially an integrated control circuit and an operating means for lighting means, lamps or luminaries, which allows to provide a combined sensing/detection of temperature and presence, e.g. an activity or motion, in order to preferably control an output of the lighting means. In particular, the temperature is preferably sensed at the lighting means and in particular at an LED string comprising at least one LED.

SUMMARY OF THE INVENTION

The integrated control circuit according to the invention provides an intelligent temperature monitoring (ITM) capabilities to evaluate a temperature indicating signal, e.g. an electrical signal, generated by a temperature sensing means. Further, the integrated control circuit also allows evaluating a presence indicating signal. The presence indicating signal is a result from a presence detection signal, e.g. a trigger signal, generated by a presence sensing means, (e.g. a presence/motion detector), which, upon detection of an activity/motion in a monitored area (for example a corridor, a staircase, an entrance area, a lobby, . . . ) issues the presence detection signal.

A feature of the integrated control circuit according to the invention is that the temperature indicating signal and the presence indicating signal are evaluated by the integrated control circuit but more importantly are received at one common input, e.g. a single input pin, as the electrical signal. Therefore, there is no requirement for a separate input for each of the indicating signals and the costs and complexity of the integrated control circuit can be reduced.

The invention therefore provides an integrated control circuit, an operating means and a method according to the independent claims. Further features of the invention are defined in the dependent claims.

In an first aspect, an integrated control circuit for operating means for lighting means is provided, the integrated control circuit having at least one output for supplying a signal controlling a switch, such as e.g. a transistor, of the operating means, in particular controlling directly or indirectly a dimming level of a lighting means, and a common input arranged for being supplied with a combination of a temperature indicating signal and a presence indicating signal, the integrated control circuit being designed to adjust the switch control signal as a function of the signal at the common input.

The integrated control circuit can be configured to directly or indirectly control the dimming level of a lighting means, preferably an LED-String comprising at least one LED, by controlling the switch based on an electrical signal received at the common input.

The integrated control circuit may be configured to evaluate a value of the electrical signal preferably as the temperature indicating signal when and/or as long as the value of the electrical signal exceeds/falls below a specific threshold value.

The integrated control circuit can be configured to set, directly or indirectly, the lighting means to a first predetermined dimming level when the value of the electrical signal falls below/exceeds the specific threshold value. The integrated control circuit may be configured to set, directly or indirectly, the lighting means to a second predetermined dimming level when the value of the electrical signal exceeds/falls below the specific threshold value.

The electrical signal, preferably a voltage, can be varying with a temperature sensed by a temperature sensing means, the electrical signal representing the temperature indicating signal. The control integrated control circuit can evaluate the electrical signal to obtain the value of the electrical signal.

The integrated control circuit may be adapted to detect that the temperature sensing means is disconnected or does not work properly when the value of the electrical signal exceeds/falls below a fifth threshold value. The integrated control circuit may be configured to ignore the electrical signal when the value of the electrical signal exceeds/falls below the fifth threshold value.

The integrated control circuit can be configured to deactivate the lighting means when the voltage exceeds/falls below a fourth threshold value.

The integrated control circuit may be configured to dim down/decrease the dimming level of the lighting means when the value of the electrical signal exceeds/falls below a third threshold value.

The integrated control circuit can be configured to, directly or indirectly, dim up/increase the dimming level of the lighting means when the value of the electrical signal falls below/exceeds a second threshold value.

The integrated control circuit may be configured to activate, directly or indirectly, the lighting means when the value of the electrical signal falls below/exceeds a first threshold value, e.g. when the lighting means was deactivate due to a previous excess of/fall below the fourth threshold value.

The integrated control circuit can be configured to control the lighting means, directly or indirectly, to the first predetermined dimming level of preferably 5-15%, more preferably 10%.

The integrated control circuit may be configured to set, directly or indirectly, the lighting means to the second predetermined dimming level of preferably 80-100%, especially when the value of the electrical signal is between the second and the third threshold value.

The temperature sensing means can be a temperature sensor and especially an Ohmic resistor.

The presence indicating signal may be generated by the switching of a switching element external to the integrated control circuit. The integrated control circuit can evaluate the electrical signal falling below/rising over the specific threshold value as being indicative of a presence being sensed by the presence sensing means.

The integrated control circuit controls, adjusts or changes the dimming level of the lighting means indirectly by setting an operating parameter of the lighting means based on the electrical signal or directly.

In another aspect, an operating means for lighting means is provided, having an integrated control circuit according as described above as well as at least one switched circuitry controlled by the output signal of said circuit.

The integrated control circuit can comprise a switching element. The switching element can be configured to perform a switching operation upon receipt of a presence detection signal, e.g. a trigger signal, preferably received from a presence sensing means, especially switching the common input to a predetermined potential, e.g. ground, thereby causing the electrical signal at the common input to assume a specific value. E.g. the value of the electrical signal changes to a predetermined value or a predetermined value range when the switch is activated/deactivated, in particular falling below/being in excess of the specific threshold value.

The presence sensing means, preferably is a presence or motion detector, sensing an activity and/or movement in a monitored area.

In another aspect, a method for controlling a lighting means based on a temperature indicating signal and a presence indicating signal is provided. An integrated control circuit can directly or indirectly control the dimming level of a lighting means based on the temperature indicating signal and the presence indicating signal received at a common input of the integrated control circuit as an electrical signal.

The integrated control circuit may evaluate the electrical signal in relation to at least one specific threshold value and can set, directly or indirectly, the lighting means to a predetermined dimming level when the value of the electrical signal falls below/exceeds the specific threshold value. The integrated control circuit may evaluate the electrical signal as the temperature indicating signal when the value of the electrical signal exceeds/falls below the specific threshold value and can set, directly or indirectly, the dimming level of the lighting means depending on the temperature indicating signal.

A switching element, e.g. a switch or a transistor (FET, MOSFET, . . . ), upon receipt of a presence detection signal from a presence sensing means, switches the electrical signal to a predetermined potential causing the electrical signal at the common input to assume a specific value, indicative of a presence being detected.

The integrated control circuit may not evaluate the electrical signal as a temperature indicating signal, when the value of the electrical signal falls below/exceeds the specific threshold value.

BRIEF DESCRIPTION OF THE DRAWINGS

The invention is now also described with reference to the Figures. In particular

DETAILED DESCRIPTION OF THE PREFERRED EMBODIMENTS

Figure 1:
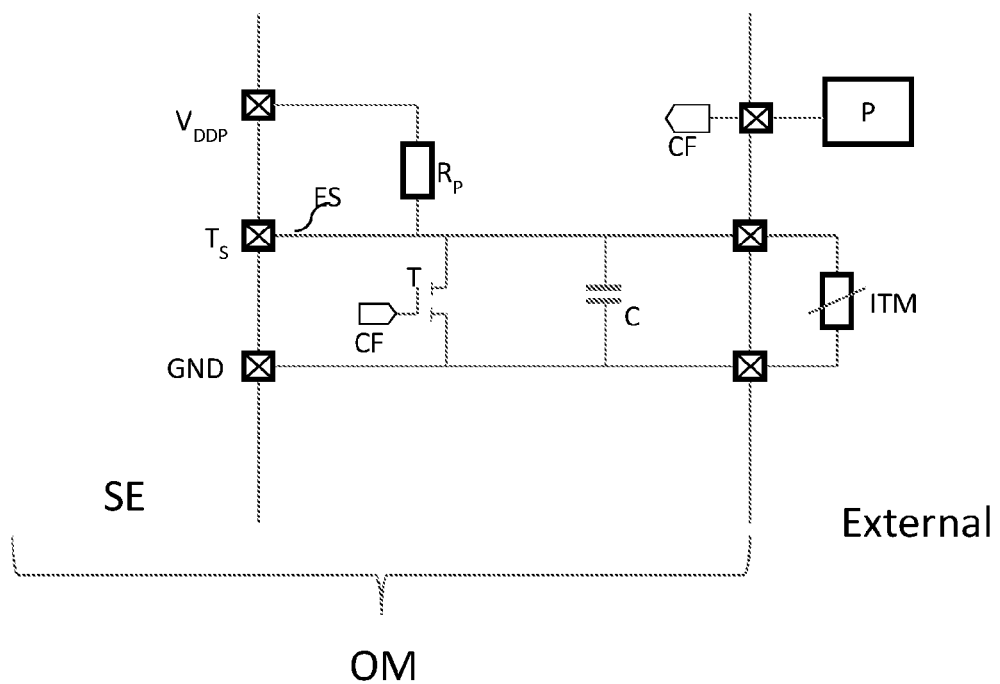
FIG. 1 shows a schematic of the inventive circuitry.

Based on the signal received by the integrated control circuit at the common input, the integrated control circuit adjusts or controls the dimming level of a lighting means that is connected directly or indirectly with the integrated control circuit. 'Directly' means that the dimming level is controlled by the integrated control circuit without using an intermediate intelligent circuitry (IC, ASIC, Microcontroller) on the path from the integrated control circuit to the lighting means. 'Indirectly' means that the integrated control circuit influences at least on other circuit element to, in the end, cause the lighting means to be dimmed to the desired dimming level.

In particular, the integrated control circuit can control a switch to adjust e.g. a PWM, frequency or PFC dimming of the lighting means via an output of the integrated control circuit. The integrated control circuit can also in addition or alternatively set an operating parameter in a device/circuit component controlling the dimming level of the lighting means to cause this device to adjust the dimming level accordingly. Hence, the integrated control circuit can control or set the dimming level of the lighting means directly or indirectly.

Particularly, the integrated control circuit may control a first and a second predetermined dimming level dependent on the electrical signal received on the common input.

Especially, the dimming level can be set based on the presence indicating signal. Depending on the electrical signal at the common input the dimming level can be set to a first predetermined dimming level. Hence, when the presence indicating signal is indicative of a presence detected by the presence sensing means, the integrated control circuit controls the dimming level of the lighting means to the first predetermined dimming level of preferably 5-15%, more preferably 10% dimming.

To determine whether the presence indicating signal is indicative of a presence, the integrated control circuit evaluates the electrical signal and can compare it to a specific threshold value. Depending on whether the evaluated value of the electrical signal falls below or exceeds the specific threshold value, the integrated control circuit controls the dimming level to the first predetermined dimming level.

Dimming the lighting means based on the presence indicating signal is advantageous to provide a 'corridor function' in an operating means for a lighting means.

A corridor function allows to operate the lighting means with a reduced light output when no presence is detected, e.g. in a stair case, but to provide full or increased light output in case a presence is detected. The presence sensing means may therefore provide a timeout function to indicate that there is no presence detected after a specified time has passed after the last presence was detected.

Further, the integrated control circuit can control the dimming level dependent on the temperature indicating signal, preferably indicating a temperature at the lighting means. This can, in particular, be performed to prevent an overheating of the lighting means. Especially, the integrated control circuit can control the dimming level of the lighting means to a second predetermined dimming level, which is typically the normal operating dimming level of 80%-100% dimming, which causes the lighting means to output a specified light output (wherein the maximum can be defined by a parameter in the integrated control circuit or the operating means). The dimming level can in particular be decreased or increased based on the temperature indicating signal.

The invention now in particular allows performing a temperature dependent control of the dimming level of the lighting means during the time the presence indicating signal is indicative of a presence, i.e. during the time starting from which a presence is detected by the presence sensing means till the timeout is reached. Instead of the timeout also other signals could be used.

Also, instead of the presence sensing means, other sensing means could be used such as door/window contacts, photo (light barrier) or light sensors, etc.

When the presence indicating signal does not indicate a presence, the integrated control circuit may not perform a temperature dependent control of the dimming level.

Especially, the presence detection signal may cause a switching element of the operating means to switch the electrical signal to a specific potential so that the integrated control circuit evaluates the electrical signal to a predetermined value or within a predetermined value range.

However, even in case the electrical signal is switched to the specific potential, a temperature sensing of the electrical signal could be performed in case the integrated control circuit allows sensing with a high resolution. The potential preferably lies above or below the specific threshold value.

Generally, the integrated control circuit can e.g. be an ASIC, an IC or a Microcontroller or a combination thereof.

More concretely, the invention allows detecting/sensing the temperature indicating that the lighting means is dimmed to a predefined level of for example 100% dimming level. 100% dimming level in this regard means that the light output of the lighting means is preferably increased to the nominal dimming level of the lighting means, i.e. that the output of the lighting means is changed to the level of an undimmed lighting means operation.

After a specified time period since the last activity is detected in the area monitored by the presence sensing means (presence, movement, etc.) has passed, the lighting means is dimmed to a non-zero first predetermined dimming level of for example 10%.

In the following, this function is referred to as 'corridor function', where the corridor function is off, when the lighting means is operated at the second predefined/predetermined dimming level (e.g. 100%) and the corridor function is on, when the lighting means is operated at the first predefined/predetermined dimming level, e.g. at a dimming level of 10%. 10% dimming level in this case means that the light output of the light source is reduced to 10% of the 100% light output.

The invention e.g. monitors the temperature using a temperature sensing means ITM, especially a temperature dependent Ohmic resistor, only when the corridor function is off, i.e. while the corridor function does not control a reduced dimming of for example 10% dimming level.

However, as soon as the corridor function becomes active, the presence sensing means pulls down/up the electrical signal at the common input pin to a very low/high potential, which causes the integrated control circuit to dim the lighting means to the first predetermined dimming level.

While the corridor function is on, the integrated control circuit will operate the lighting means with this first predetermined dimming level and the circuitry is 'blind' to temperature sensing.

FIG. 1 schematically shows an integrated control circuit SE with three input pins. Of course, it has to be understood that the integrated control circuit SE can, in fact, have more input and/or output pins. In particular, the integrated control circuit SE can be an LED driver circuit (e.g. ASSP or Application Specific Standard Product). A voltage supply pin $V_{DDP}$ is connected to the common input $T_S$ via a protection resistor $R_P$. The integrated control circuit SE is comprised in the operating means OM. The common input $T_S$ is connected to ground pin GND via the temperature sensing means ITM, which is preferably arranged outside the operating means OM and close to the lighting means (not shown).

In parallel to the temperature sensing means ITM a capacity C and a switching element T is connected, wherein the switching element T is activated or deactivated when a signal CF is received from presence sensing means P. In particular, the switching element T switches the common input $T_S$ to the ground potential at the ground pin GND.

In FIG. 1 the signal discrimination circuit shown is actively supplied in a selective manner starting from the voltage supply pin $V_{DDP}$. Alternatively, the common input $T_S$ of the circuitry can also alternatively provide a supply voltage. If the common input $T_S$ supplies such a voltage the current drawn at the common input $T_S$ is indicating the presence/temperature signal.

However, the 'blindness' of the integrated control circuit to temperature sensing is relative. For example, during periods in which the corridor function is on, all slowly varying changes of the electrical signal can be detected at the integrated control circuit SE. This, of course, depends on the resolution with which the electrical signal on a level below or above the specific threshold value can be detected and evaluated by the integrated control circuit SE.

The temperature sensing and the presence detection are e.g. 'encoded' via an amplitude of the electrical signal ES at the common input $T_S$. However, other 'encodings' are possible. For example, at least one of the temperature indicating signal and the presence indicating signal can be encoded as a switched signal, wherein the frequency, the duty cycle, etc. of the signal encodes the value. Also, both signals can be encoded as switched signals with different parameters (for example one being a high frequency signal, the other one being a low frequency signal). In other encodings that go beyond amplitude encoding, the temperature indicating signal and/or the presence indicating signal can be periodically switched signals.

It is important to note that the integrated control circuit SE receives the temperature indicating signal and the presence indicating signal at the common input $T_S$ and hence there is no need for two separate inputs/pins. However, as also shown in FIG. 1, the operating means OM may comprise an additional separate input and a user may hence be presented with two different pins at the casing in which integrated control circuit SE and/or the operating means OM are cased. But internally, these pins are then again connected only the common input $T_S$ of the integrated control circuit SE.

Figure 2:
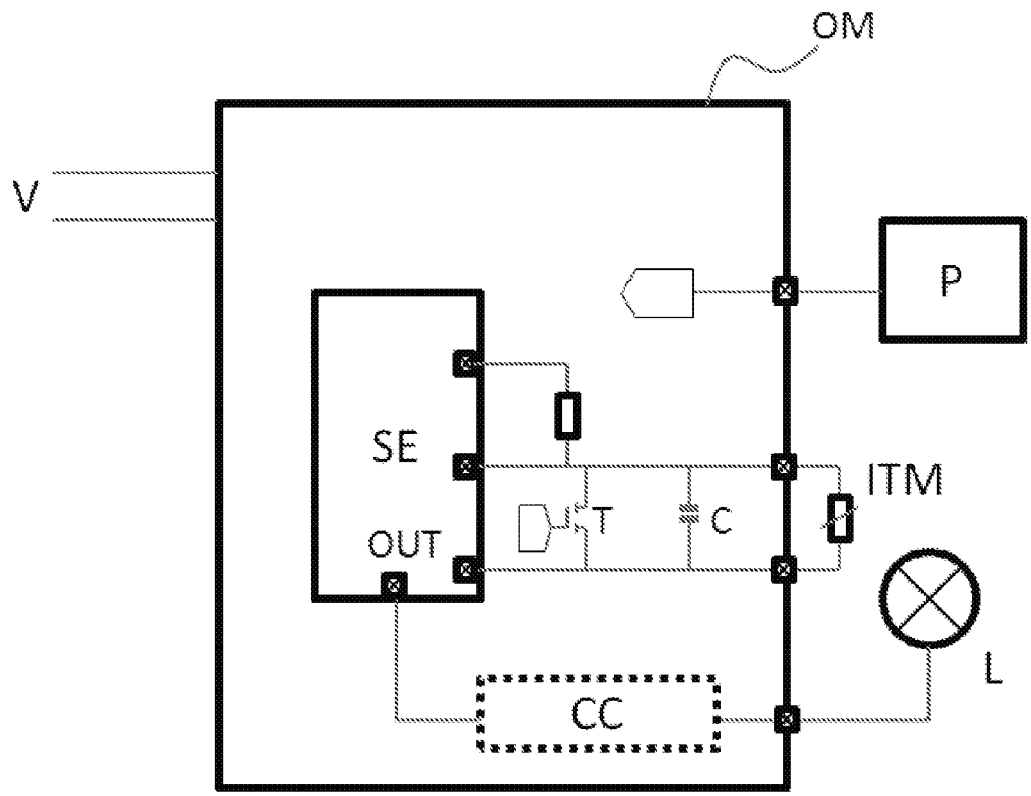
FIG. 2 illustrates a embodiment according employing the inventive circuitry.

FIG. 2 shows an example for a setup using the circuitry from FIG. 1.

FIG. 2 shows a diagram which exemplarily shows how the circuit according to the invention works. Like components from FIG. 1 are referenced by the same reference signs. Additionally, a power/voltage/current supply V for the operating means OM is shown, from which the integrated control circuit SE can be supplied directly or indirectly, e.g. via an rectifier. Also additionally a lighting means L is shown at which the temperature sensing means ITM senses a temperature, producing a temperature indicating signal.

The integrated control circuit SE is shown with an additional output OUT, which is used to directly, e.g. by controlling a switch causing a dimming, e.g. for PFC, frequency or PWM dimming, or indirectly by setting a parameter in an additional circuitry component CC controlling the dimming level of lighting means L.

Another embodiment is that the combination of the presence indicating signal and the temperature indicating signal occurs outside of the operating means OM.

Figure 3:
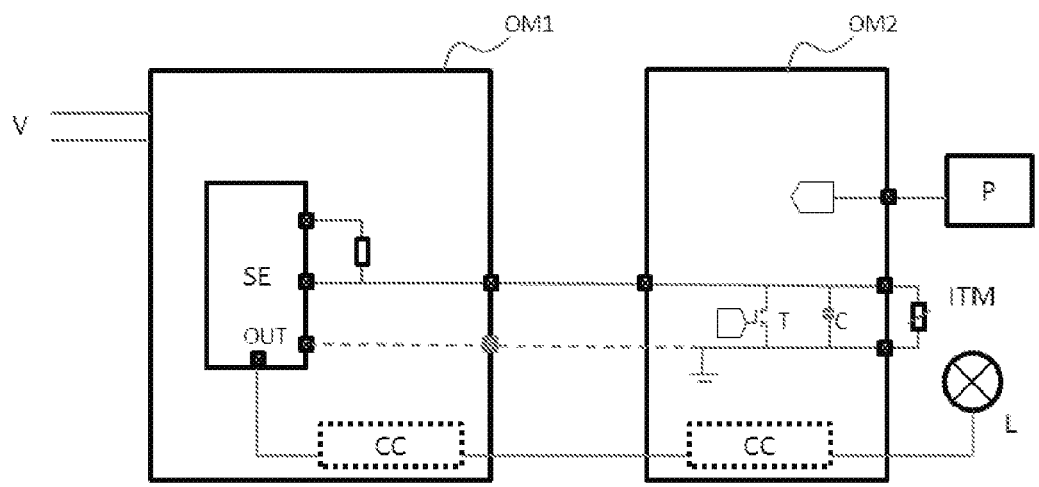
FIG. 3 illustrates another embodiment according employing the inventive circuitry.

This is shown in FIG. 3, where a first operating means portion OM1, basically corresponding to operating means OM, is shown with the integrated control circuit SE. The integrated control circuit SE again shows the output OUT as described for FIG. 2. The integrated control circuit SE is again supplied directly or indirectly from a supply V as outlined for FIG. 2. Again, the integrated control circuit SE can directly or indirectly control the dimming level of the lighting means L, at which the temperature sensing means ITM senses the temperature.

However, the combining circuitry combining the temperature indicating signal and the presence indicating signal is now part of a second operating means portion OM2. Especially, the switching element T and the capacity C are moved to the second operating means portion OM2. Hence, in case the second operating means portion OM2 is connected to ground, the electrical signal can be switched to the ground potential by the switching element T in the second operating means portion OM2. This switching occurs in case the presence sensing means detects no activity/motion for a predefined time. Also the additional circuitry component CC may either be located in the first operating means portion OM2 or second operating means portion OM2, but in case further additional circuitry components are necessary, an additional circuitry component CC may be present in the first operating means portion OM1 and the second operating means portion OM2.

In case the specific potential to which the electrical signal is switched by switching element T is present in the second operating means portion OM2, only one connection needs to be present between the first operating means portion OM1 and the second operating means portion OM2 for conducting the electrical signal to the common input $T_S$ of the integrated control circuit SE. If a connection to ground pin GND of the integrated control circuit SE is required or the specific potential is not available in the second operating means portion OM2, a second connection is required as indicated by the dashed line in FIG. 3.

Of course, also the protection resistor $R_P$ could be moved to the second operating means portion OM2 by extending the connection extending from pin $V_{DDP}$ and by addition of additional connection points at the first operating means portion OM1 and the second operating means portion OM2. This embodiment is not shown.

At the common input $T_S$ the electric signal, preferably a voltage or current, is evaluated. The electrical signal is indicative of the temperature at the lighting means and of a detected presence. Furthermore, a range of threshold values are defined and, depending on the relation of the electric signal evaluated/measured at the common input $T_S$ to the threshold values, the integrated control circuit SE behaves differently. In particular it controls the dimming level of lighting means L differently. The threshold values can be stored in the integrated control circuit SE. All threshold values define different threshold values for the electric signal.

Figure 4:
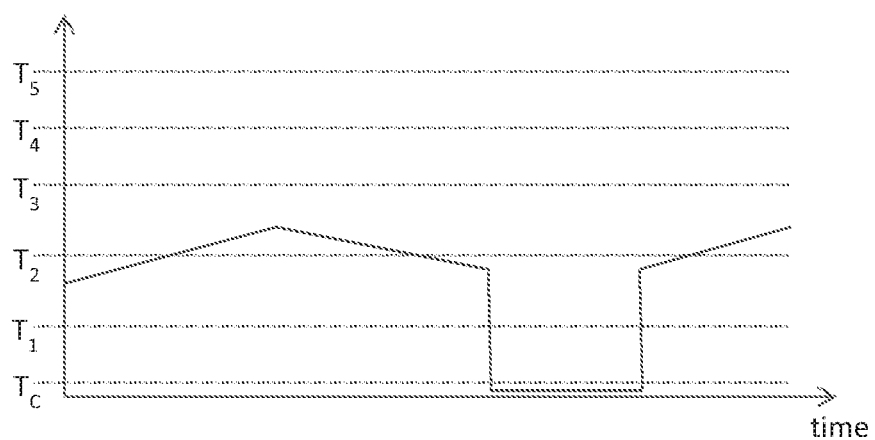
FIG. 4 shows threshold values versus time or variance of threshold values upon time.

In the example shown in FIG. 4, six threshold values are be used for controlling the lighting means L. Hence, for example, if the value determined by the integrated control circuit SE for the electrical signal at the common input $T_S$ exceeds a fifth threshold value $T_5$, the control circuit e.g. determines that no temperature sensing means ITM is connected. Hence, temperature information is ignored by the integrated control circuit SE and only presence detection is performed.

If the value of the electrical signal exceeds a fourth threshold value $T_4$ but stays below the fifth threshold value $T_5$, the integrated control circuit SE will shut down the lighting means L or would take the necessary measures to indirectly shut down the lighting means L. Such a value of the electrical signal would indicate a very high temperature at the lighting means L and the shutdown is hence performed to prevent damage of the lighting means.

If the value of the electrical signal exceeds a third threshold value $T_3$, the integrated control circuit SE will start dimming the lighting means L in order to prevent further increase of the temperature at the lighting means L.

If the temperature then falls below a second threshold value $T_2$, the integrated control circuit SE will again dim up or increase the dimming level of the lighting means L. E.g. through the down dimming after an excess of the third threshold value $T_3$ it is determined that the lighting means L has cooled down enough so that the lighting means L can operated normally.

Hence, as long as the value of the electrical signal stays between the second and the third threshold value $T_2$, $T_3$ the lighting means can be operated normally and preferably with the second predetermined dimming level of e.g. 100%.

If the value of the electrical signal falls below a first threshold value $T_1$, the integrated control circuit SE will turn on the lighting means again (again directly or indirectly) if it was shut down due to an increase of the value of the electrical signal over the fourth threshold value $T_4$ as mentioned above.

After the corridor function is activated, for example due to a timeout at the presence sensing means after a last movement/presence was detected, the presence sensing means P activates/deactivates the switching element T. Thus, the electrical signal at the common input $T_S$ is pulled below the specific threshold value $T_C$. The integrated control circuit SE then controls the dimming level of the lighting means L to preferably about 10% or above. The switching element T can be activated when the presence detection signal CF is high/low and deactivated when the presence detection signal CF is low/high. The presence detection signal is generated by the presence sensing means P.

Hence, when the presence detection signal CF is high/low, the switching element T is on/off, or vice versa, and the electrical signal at the common input $T_S$ drops to a lower value, especially a voltage value pulled below the specific threshold value $T_C$, which is close to but not necessarily zero (Volt). This means that after the electrical signal is pulled below the specific threshold value $T_C$, effectively the temperature sensing by the temperature sensing means is deactivated.

Thus, when the corridor function is inactive and the lighting means is operated at the second predetermined dimming value, the lighting means L is monitored and the dimming level thereof is controlled especially to prevent the lighting means L to become too hot, i.e. to prevent the temperature at the lighting means L to increase above a defined threshold value ($T_4$).

This behavior can also be exemplarily described by:

| Value of the electrical signal | Action of/Evaluation at the integrated control circuit SE |
|---|---|
| >$T_5$ | Temperature sensing means ITM is not connected, temperature sensing signal is ignored. |
| >$T_4$ | Lighting means L is shut off. |
| >$T_3$ | Lighting means L is dimmed down. |
| <$T_3$ but >$T_2$ | Normal operation at the second predetermined dimming level. |
| <$T_2$ | Lighting means L is dimmed up. |
| <$T_1$ | Lighting means L is shut on if it was shut off due to an increase of the value of the electrical signal over the fourth threshold value $T_4$. |
| <$T_C$ | Activate corridor function; preferably no temperature sensing or evaluation of the electrical signal in this regard is performed. |

Of course, in case the threshold values and the electrical values are defined differently, the integrated control circuit SE may determine that the value of the electrical signal falls below a threshold value instead checking whether the value of the electrical signal is in excess of a threshold value as mentioned above, and vice versa.

Alternatively, it would also be possible to pull the electrical signal at the common input $T_S$ to a high potential so that the electrical signal at common input $T_S$ exceeds the fifth threshold value $T_5$ and hence the electrical signal is ignored for temperature sensing.

However, even if the electrical signal drops below the specific threshold value $T_C$, the temperature could still be measured in case the integrated control circuit allows sensing the electrical signal with a high enough resolution so that temperature fluctuations or changes could be detected.

The operating means OM and the first operating means portion OM1 can in particular be or comprise a LED driving module. In particular, the second operating means portion OM2 can be a separate extension module to provide additional functionality to the first operating means portion OM1.

The invention hence multiplexes the information of corridor function, i.e. the information received from the presence sensing means P, to the same integrated control circuit SE input to attain a different fade rate and dim level when compared to the fade rate and dim level according to the signal generated by the temperature sensing means ITM.

It should be noted, that the integrated control circuit SE may also dim the lighting means L by issuing a dimming command via a bus interface to a bus system, e.g. a DALI bus. Also, the operating means and/or the integrated control circuit SE can be connected to such a bus system. The integrated control circuit SE may also include at least one A/D-converter to evaluate the electrical signal and to determine a value of the electrical signal.

The invention claimed is:

1. Integrated control circuit for an operating circuit for lighting means, the integrated control circuit having:
   at least one output for supplying a signal controlling a switch of the operating circuit, in particular controlling directly or indirectly a dimming level of a lighting means, and
   a common input arranged for being supplied with an electrical signal indicative of a combination of a temperature indicating signal and a presence indicating signal, wherein the electrical signal is voltage or current,
   the integrated control circuit being designed to adjust the switch control signal as a function of the electrical signal at the common input,
   wherein the integrated control circuit is configured to evaluate a value of the electrical signal received at the common input, when, or as long as the value of the electrical signal exceeds or falls below a specific threshold value, or when, and as long as the value of the electrical signal exceeds or falls below the specific threshold value, wherein the value of the electrical signal is a value of the voltage or a value of the current.

2. Integrated control circuit according to claim 1, wherein the integrated control circuit is configured to directly or indirectly control the dimming level of the lighting means by controlling the switch based on the electrical signal.

3. Integrated control circuit according to claim 2, wherein the electrical signal is varying with a temperature sensed by a temperature sensing means, representing the temperature indicating signal, and wherein the integrated control circuit is configured to evaluate the electrical signal to obtain the value of the electrical signal.

4. Integrated control circuit according to claim 3, wherein the integrated control circuit is adapted to detect that the temperature sensing means is disconnected or does not work properly when the value of the electrical signal exceeds or falls below a fifth threshold value, which is the highest threshold value of a set of threshold values, and wherein the integrated control circuit is configured to ignore the electrical signal when the value of the electrical signal exceeds the fifth threshold value.

5. Integrated control circuit according to claim 4, wherein the integrated control circuit is configured to deactivate the lighting means when the value of the electrical signal exceeds a fourth threshold value of the set of threshold values and is below the fifth threshold value, wherein the fifth threshold value is greater than the fourth threshold value.

6. Integrated control circuit according to claim 5, wherein the integrated control circuit is configured to decrease the dimming level of the lighting means when the value of the electrical signal exceeds a third threshold value of the set of threshold values, wherein the fourth threshold value is greater than the third threshold value.

7. Integrated control circuit according to claim 6, wherein the integrated control circuit is configured to, directly or indirectly, increase the dimming level of the lighting means when the value of the electrical signal falls below a second threshold value of the set of threshold values, wherein the third threshold value is greater than the second threshold value.

8. Integrated control circuit according to claim 7, wherein the integrated control circuit is configured to activate, directly or indirectly, the lighting means when the value of the electrical signal falls below a first threshold value of the set of threshold values, wherein the second threshold value is greater than the first threshold value.

9. Integrated control circuit according to claim 3, wherein the temperature sensing means is a temperature sensor.

10. Integrated control circuit according to claim 9, wherein the temperature sensing means is an ohmic resistor.

11. Integrated control circuit according to claim 5, wherein the integrated control circuit is configured to activate, directly or indirectly, the lighting means when the lighting means was deactivate due to a previous excess of the fourth threshold value.

12. Integrated control circuit according to claim 1, wherein the integrated control circuit is configured to control the dimming level of a lighting means by setting directly or indirectly, the lighting means to a predetermined dimming level of at least two predetermined dimming levels when the value of the electrical signal falls below or exceeds the specific threshold value.

13. Integrated control circuit according to claim 12, wherein the integrated control circuit is configured to control the lighting means, directly or indirectly, to the first predetermined dimming level.

14. Integrated control circuit according to claim 13, wherein the first predetermined dimming level is of 5-15%.

15. Integrated control circuit according to claim 12, wherein the integrated control circuit is configured to set, directly or indirectly, the lighting means to the second predetermined dimming level.

16. Integrated control circuit according to claim 15, wherein the integrated control circuit is configured to set the lighting means to the second predetermined dimming level of 80-100%.

17. Integrated control circuit according to claim 16, wherein the integrated control circuit is configured to set the lighting means to the second predetermined dimming level when the value of the electrical signal is between two threshold values.

18. Integrated control circuit according to claim 1, wherein the presence indicating signal is generated by the switching of a switching element external to the integrated control circuit and wherein the integrated control circuit is configured to evaluate the electrical signal falling below or rising over the specific threshold value as being indicative of a presence being sensed by the presence sensing means.

19. Integrated control circuit according to claim 1, wherein the integrated control circuit controls the dimming level of the lighting means indirectly by setting an operating parameter of the lighting means based on the electrical signal or directly.

20. Integrated control circuit according to claim 1, wherein the presence indicating signal is generated by the switching of a switching element external to the integrated control circuit and wherein the integrated control circuit is configured to evaluate the electrical signal falling below or rising over the specific threshold value as being indicative of a presence being sensed by the presence sensing means, and wherein the switching element is configured to perform a switching operation upon receipt of a trigger signal, thereby causing the electrical signal at the common input to assume a specific value.

21. Integrated control circuit according to claim 20, wherein the presence sensing means is a presence or motion detector, sensing an activity or movement in a monitored area, or sensing an activity and movement in the monitored area.

22. Integrated control circuit according to claim 20, wherein the trigger signal is received from the presence sensing means.

23. Integrated control circuit according to claim 20, wherein the switching element is configured to perform a switching of the common input to a predetermined potential.

24. Integrated control circuit according to claim 23, wherein the predetermined potential is a ground.

25. Integrated control circuit according to claim 1, wherein the switch is a transistor.

26. Integrated control circuit according to claim 1, wherein the lighting means is an LED-String comprising at least one LED.

27. Integrated control circuit according to claim 1, wherein the integrated control circuit is configured to evaluate the value of the electrical signal as the temperature indicating signal.

28. Method for controlling a lighting means based on a temperature indicating signal and a presence indicating signal, wherein the method comprises a step of controlling, by an integrated control circuit, directly or indirectly, a dimming level of the lighting means based on an electrical signal indicative of the temperature indicating signal and the presence indicating signal and received at a common input of the integrated control circuit, wherein the electrical signal is voltage or current,
wherein a value of the electrical signal is evaluated by the integrated control circuit, when or as long as the value of the electrical signal exceeds or falls below a specific threshold value, or when and as long as the value of the electrical signal exceeds or falls below the specific threshold value, wherein the value of the electrical signal is a value of the voltage or a value of the current.

29. Method according to claim 28 further comprising the steps of:
evaluating, by the integrated control circuit, the electrical signal in relation to a specific threshold value,
setting, by the integrated control circuit, directly or indirectly, the lighting means to a predetermined dimming level when the value of the electrical signal falls below or exceeds the specific threshold value,
evaluating, by the integrated control circuit, the electrical signal as the temperature indicating signal when the value of the electrical signal exceeds or falls below the specific threshold value, and
setting, by the integrated control circuit directly or indirectly, the dimming level of the lighting means depending on the temperature indicating signal.

30. Method according to claim 28 further comprising the step of switching, by a switching element, upon receipt of a presence detection signal from a presence sensing means, the electrical signal to a predetermined potential causing the electrical signal at the common input to assume a specific value, indicative of a presence being detected.

31. Method according to claim 28 further comprising a step of not evaluating, by the integrated control circuit, the electrical signal as a temperature indicating signal, when the value of the electrical signal falls below or exceeds the specific threshold value.

32. Integrated control circuit for operating circuit for lighting means, the integrated control circuit having:
at least one output for supplying a signal controlling a switch of the operating circuit directly or indirectly a dimming level of a lighting means, and
a common input arranged for being supplied with an electrical signal as a combination of a temperature indicating signal and a presence indicating signal,
wherein the electrical signal is voltage or current,
the integrated control circuit being designed to adjust the switch control signal as a function of the electrical signal at the common input, wherein:
the electrical signal is varying with a temperature sensed by a temperature sensing means, representing the temperature indicating signal,
the integrated control circuit is configured to evaluate the electrical signal to obtain a value of the electrical signal, wherein the value of the electrical signal is a value of the voltage or a value of the current, and
the temperature sensing means is a temperature sensor.

33. Method for controlling a lighting means based on a temperature indicating signal and a presence indicating signal, wherein the method comprises a step of controlling, by an integrated control circuit, directly or indirectly, the dimming level of the lighting means based on the temperature indicating signal and the presence indicating signal received at a common input of the integrated control circuit as an electrical signal, wherein the electrical signal is voltage or current, wherein:
the electrical signal is varying with a temperature sensed by a temperature sensing means, representing the temperature indicating signal,
the method further comprises evaluating, by the integrated control circuit, the electrical signal to obtain a value of the electrical signal, wherein the value of the electrical signal is a value of the voltage or a value of the current, and
the temperature sensing means is a temperature sensor.

* * * * *